(12) United States Patent
Tseng

(10) Patent No.: US 6,923,552 B2
(45) Date of Patent: Aug. 2, 2005

(54) WIND POWER DRIVING AUXILIARY LAMP

(76) Inventor: Eddy Tseng, 235 Chung-Ho Box 8-24, Taipei (TW)

( * ) Notice: Subject to any disclaimer, the term of this patent is extended or adjusted under 35 U.S.C. 154(b) by 105 days.

(21) Appl. No.: 10/638,893

(22) Filed: Aug. 12, 2003

(65) Prior Publication Data
US 2004/0252495 A1 Dec. 16, 2004

(30) Foreign Application Priority Data
Jun. 11, 2003 (TW) .................................... 92210688 U

(51) Int. Cl.$^7$ ............................. B60Q 1/00; B60Q 1/26; F21L 13/00
(52) U.S. Cl. ........................... 362/192; 362/35; 362/96; 290/54; 416/5
(58) Field of Search ............................. 362/35, 96, 192, 362/185, 269, 271–272; 290/54; 416/5

(56) References Cited

U.S. PATENT DOCUMENTS

| | | | | | |
|---|---|---|---|---|---|
| 4,356,535 | A | * | 10/1982 | Chu | 362/35 |
| 4,935,853 | A | * | 6/1990 | Collins | 362/272 |
| 6,082,868 | A | * | 7/2000 | Carpenter | 362/96 |
| 6,086,214 | A | * | 7/2000 | Ridge | 362/96 |
| 6,175,354 | B1 | * | 1/2001 | Blissett et al. | 345/110 |
| 6,386,731 | B1 | * | 5/2002 | Cheng | 362/192 |
| 6,398,381 | B1 | * | 6/2002 | Tseng | 362/96 |
| 6,439,472 | B1 | * | 8/2002 | Lin et al. | 239/18 |
| 6,565,316 | B2 | * | 5/2003 | Li | 415/229 |
| 6,588,913 | B1 | * | 7/2003 | Huang | 362/96 |
| 6,765,324 | B1 | * | 7/2004 | Chien | 310/75 C |
| 6,790,003 | B1 | * | 9/2004 | Hu et al. | 416/5 |
| 6,832,895 | B2 | * | 12/2004 | Yoshioka et al. | 416/183 |
| 2003/0231956 | A1 | * | 12/2003 | Lin | 415/118 |

* cited by examiner

Primary Examiner—Stephen Husar
Assistant Examiner—Jason Han

(57) ABSTRACT

A wind power driving auxiliary lamp comprises a seat, a generator, a transparent cover and a circuit device. The seat has two supporting frames. The generator has a blade set and a small power generator firmly secured to a blade groove of the blade set. The blade set and the small power generator are positioned between the two supporting frames. The blade set and the small power generator rotate synchronously. A circuit device includes a circuit board in the transparent cover and a light emitting body set on the circuit board. In moving, air will push the blade set so that the small power generator and the blade set rotate synchronously, the small power generator will rotate with the central pivotal shaft so as to generate direct current power to be supplied to the light emitting body set.

6 Claims, 6 Drawing Sheets

WIND POWER DRIVING AUXILIARY LAMP

FIELD OF THE INVENTION

The present invention relates to lamps, and particularly to a wind power driving auxiliary lamp, wherein in moving, air will push a blade set in the auxiliary lamp so that a small power generator and the blade set rotate synchronously to generate direct current power to be supplied to a light emitting body set.

BACKGROUND OF THE INVENTION

Recent, auxiliary lamps are widely installed to a vehicle body for many objects, such as increasing the traffic safety at night. The current used auxiliary lamps are powered by batteries or by current from the vehicle. If the power is from batteries, since batteries only store finite power so that the batteries must be updated frequently, especially if expensive Hg batteries are used, the power level must be taken care and the update of the batteries is a trouble work.

If power is from the vehicle, the circuit must be redesigned, for example, relay, fuse or wire must be rework. If the rework is not performed well, electromagnetic interference induces, such as the audio, burglar-proof device, computer in the vehicle and alarm panel have noises. All these induce inconvenience in driving a car.

SUMMARY OF THE INVENTION

Accordingly, the primary object of the present invention is to provide a wind power driving auxiliary lamp comprising the following element:

A seat has a bottom plate and two supporting frames firmly secured to two sides of the bottom plate;

A generator has a blade set and a small power generator firmly secured to a blade groove of the blade set. The small power generator has a central pivotal shaft. Two ends of a central pivotal shaft passes through the two supporting frames so that the blade set and the small power generator are positioned between the two supporting frames. By the motionless central pivotal shaft, the blade set and the small power generator rotate synchronously;

A transparent cover; the central pivotal shaft passes through the transparent cover so that the transparent cover is fixed to the blade groove;

A circuit device includes a circuit board in the transparent cover and a light emitting body set on the circuit board. Two power lines connect the circuit device to the small power generator;

In moving, air will push the blade set so that the small power generator and the blade set rotate synchronously, the small power generator will rotate with the central pivotal shaft so as to generate direct current power to be supplied to the light emitting body set.

Moreover, the light emitting body set is distributed as two banks of light emitter bodies, in rotation, the two banks of light emitting bodies emit light as a plurality of concentric circles as visual effect.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
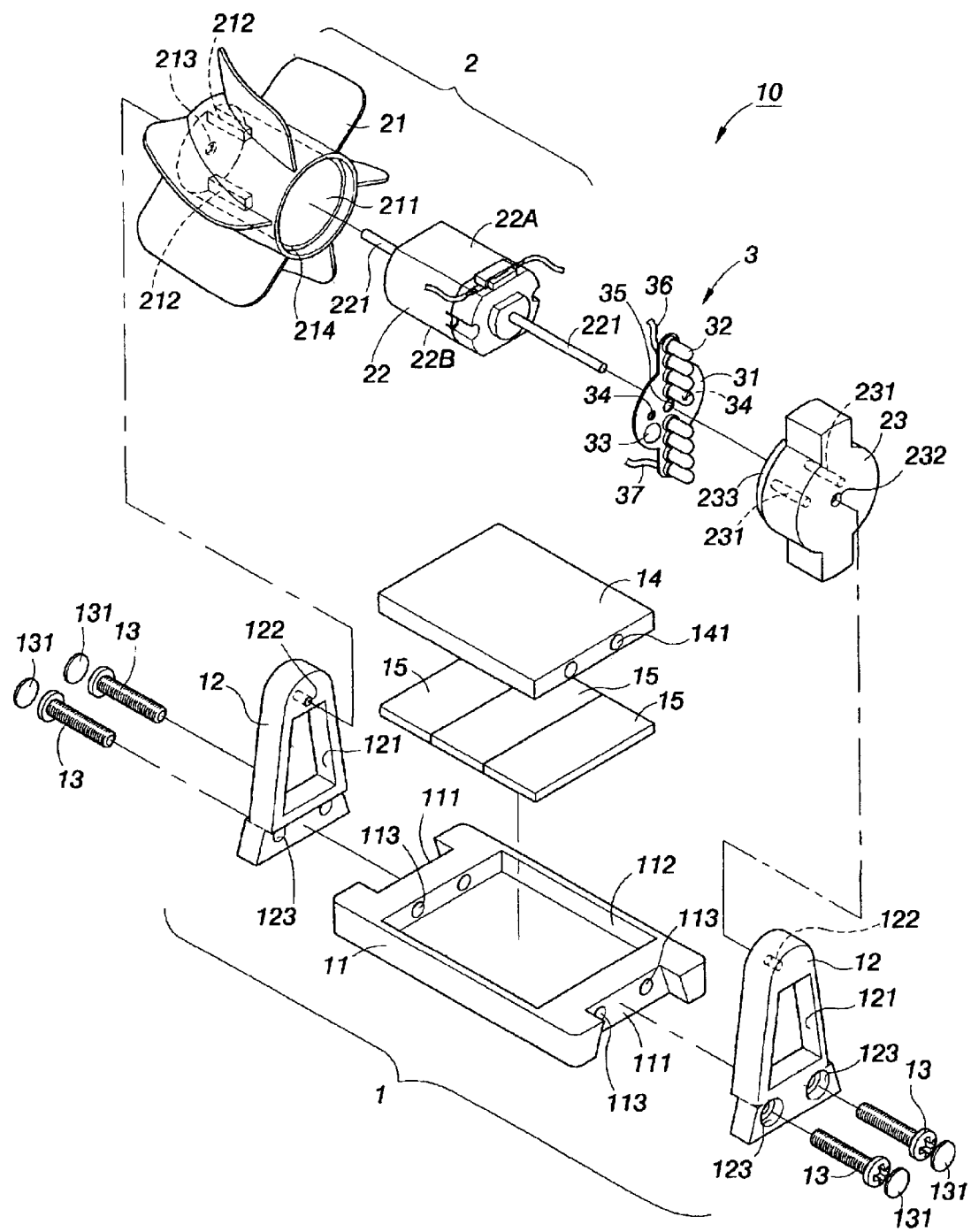
FIG. 1 is an exploded perspective view of the auxiliary lamp of the present invention.
Figure 2:
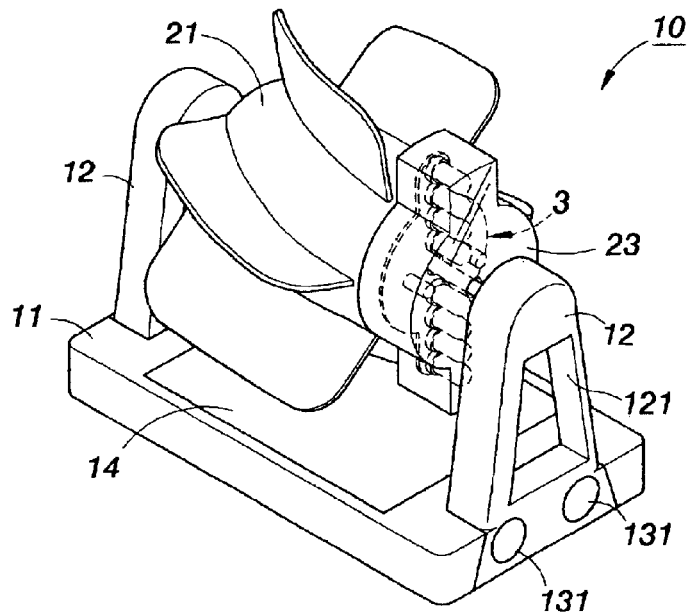
FIG. 2 is an assembled perspective view of the auxiliary lamp of the present invention.

Referring to FIG. 1, the exploded perspective view of the auxiliary lamp of the present invention is illustrated. In the present invention, the auxiliary lamp 10 includes a seat 1, a generator 2, a transparent cover 23; and a circuit device 3. The seat 1 has a bottom plate 11 and two supporting frames 12 firmly secured to two sides of the bottom plate 11. The generator 2 includes a blade set 21 and a small power generator 22 firmly secured to a blade groove 211. Two ends of a central pivotal shaft 221 of the small power generator 22 pass through the two supporting frames 12 so that the blade set 21 and the small power generator 22 are positioned between the two supporting frames 12. By the motionless central pivotal shaft 221, the blade set 21 and the small power generator 22 rotate synchronously. The central pivotal shaft 221 passes through the transparent cover 23 which is also fixed with the blade set 21. The circuit device 3 includes a circuit board 31 in the transparent cover 23 and a light emitting body set 32 on the circuit board 31. Two power lines connected to the circuit device to the small power generator 22. The assembled view is shown in FIG. 2. Thereby, when the auxiliary lamp 10 rotates the blade set 21 so that the small power generator 22 and the blade set 21 rotate synchronously, the small power generator 22 will rotate with the central pivotal shaft 221 so as to generate DC (direct current) power to be supplied to the light emitting body set 32.

Figure 3:
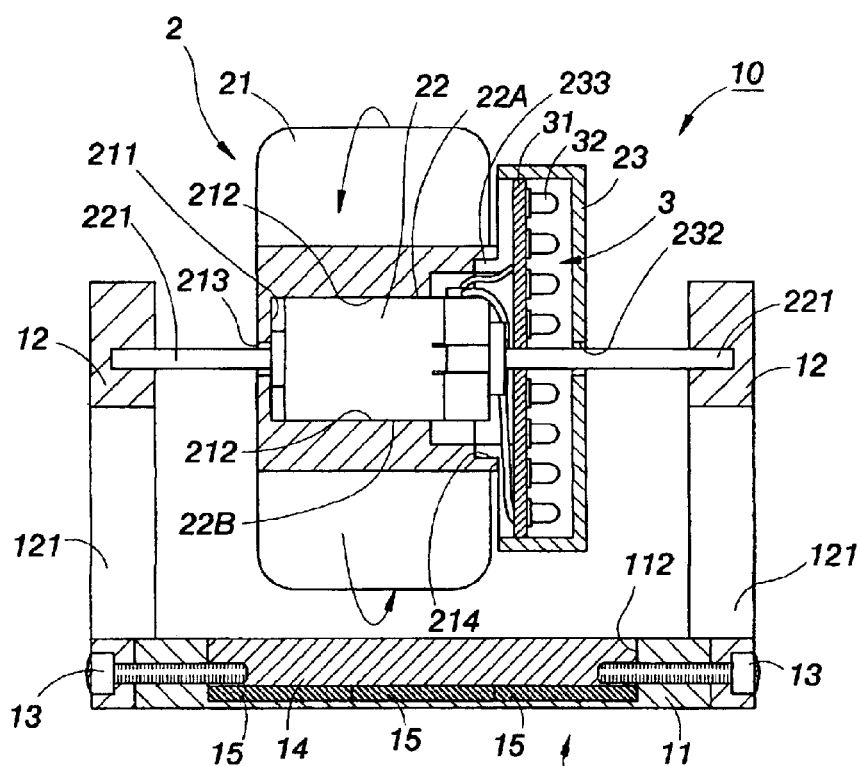
FIG. 3 is a cross sectional view of the present invention.

Referring to FIGS. 1 and 3, a whole cross sectional view of the present invention is illustrated in FIG. 3. It is illustrated in the drawing that the seat 1 includes the bottom plate 11 and the two supporting frames 12. Two sides of the bottom plate 11 have respective embedding grooves 111 for embedding the triangular supporting frames 12. Two studs 13 pass the supporting frame through holes 123 and the bottom plate through holes 113 to combine the supporting frames 12 with the bottom plate 11. To shielding the studs 13, plastic covers 131 are embedded in the supporting frame through holes 123. A top surface of the bottom plate 11 has a trench 112 for placing a magnet 15. Then a top cover 14 covers on the trench 112. The top cover 14 has lateral through holes 141 so that the studs 13 can passes through the top cover 14 to fix the top cover 14 to the trench 112. Each supporting frame 12 has a hollow hole 121 for reducing air-resistance.

The generator 2 is formed by the blade set 21 and a small power generator 22 fixed to the blade groove 211. The small power generator 22 has the central pivotal shaft 221. The top surface 22A and the bottom surface 22B of the small power generator 22 are planes. Thereby, when the small power generator 22 is located in the blade groove 211. The blade groove 211 is protruded with two ribs 212. When the small power generator 22 is placed in the blade groove 211, the ribs 212 resist against the top surface 22A and the bottom surface 22B so that the sliding groove 12 is combined to the blade set 21. Thereby, the two can rotate synchronously.

Another end of the blade set 21 is installed with the transparent cover 23 for receiving the circuit device 3. The circuit device includes a circuit board 31 and a light emitting body set 32 on the circuit board 31. A further integrated circuit (IC) 33 can be installed on the circuit device 3. Two power lines 36, 37 serve to connect the light emitting body set to the positive and negative electrodes of the small power generator 22. Two positioning rods 341 are disposed in the transparent cover 23. The two positioning rods 341 can be inserted into two positioning holes 34 of the circuit board 31 for fixing the circuit board 31. An inlet of the transparent cover 23 has a flange 233 for being embedded into a reduce edge 214 at the inlet of the blade groove 211. Thus, the small power generator 22 and the circuit device 3 are sealed in the blade groove 211 and the transparent cover 23 completely. Moreover, to have a preferred wet-proof effect, the gap between the transparent cover 23 and the blade groove 211 are sealed by glue or resin.

Besides, the central pivotal shaft 221 passes through the small power generator 22. One end of the central pivotal shaft 221 passes through a circuit board through hole 35 and a transparent cover through hole 232 to a fixing hole 122 at an upper end of the supporting frame 12. Another end thereof passes through a through hole 213 at a lower wall of the blade groove 211 to a fixing hole 122 of another supporting frame 12 so that the generator 2 and the circuit device 3 are supported between the supporting frames 12 by the supporting of the central pivotal shaft 221. The central pivotal shaft 221 is motionless. When the blade set 21 rotates, only the small power generator 22, transparent cover 23, and circuit device 3 rotate therewith.

Figures 4, 5, 6:
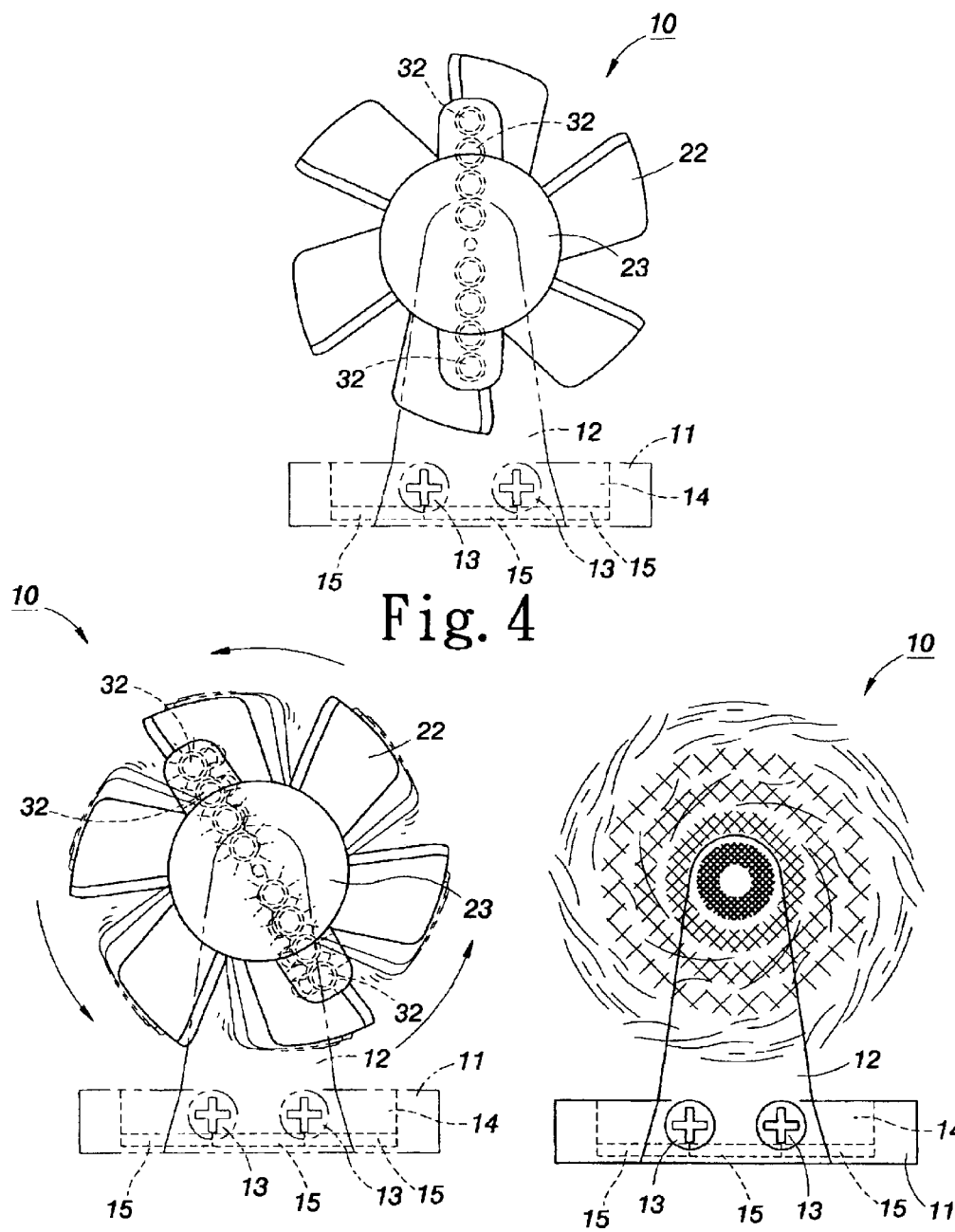
FIG. 4 shows the distribution of the blade set of the present invention.
FIG. 5 is a schematic view about the light emitting body set of the auxiliary lamp of the present invention.
FIG. 6 is a schematic view showing that the auxiliary lamp of the present invention rotates rapidly.

FIG. 4 shows the distribution of the light emitting body set 32 of the auxiliary lamp 10 of the present invention, wherein the light emitting body set 32 is distributed as two banks of light emitter bodies. When driving, outdoor airflow will push the blade set 21 and the small power generator 22 to rotate with respect to the central pivotal shaft 221 so as to generate DC current. Thereby, the light emitting body set 32 lights up, as shown in FIG. 5. When the blade set 21 rotates rapidly. The blade set 21 rotates therewith. By the visual effect, a plurality of concentric circles are generated, as shown in FIG. 6, so that the auxiliary lamp 10 likes an alarm light. The lighting sequence of the light emitting body set 32 can be controlled by the IC so as to generate single or multiple or mixing color flashes.

Figure 7:
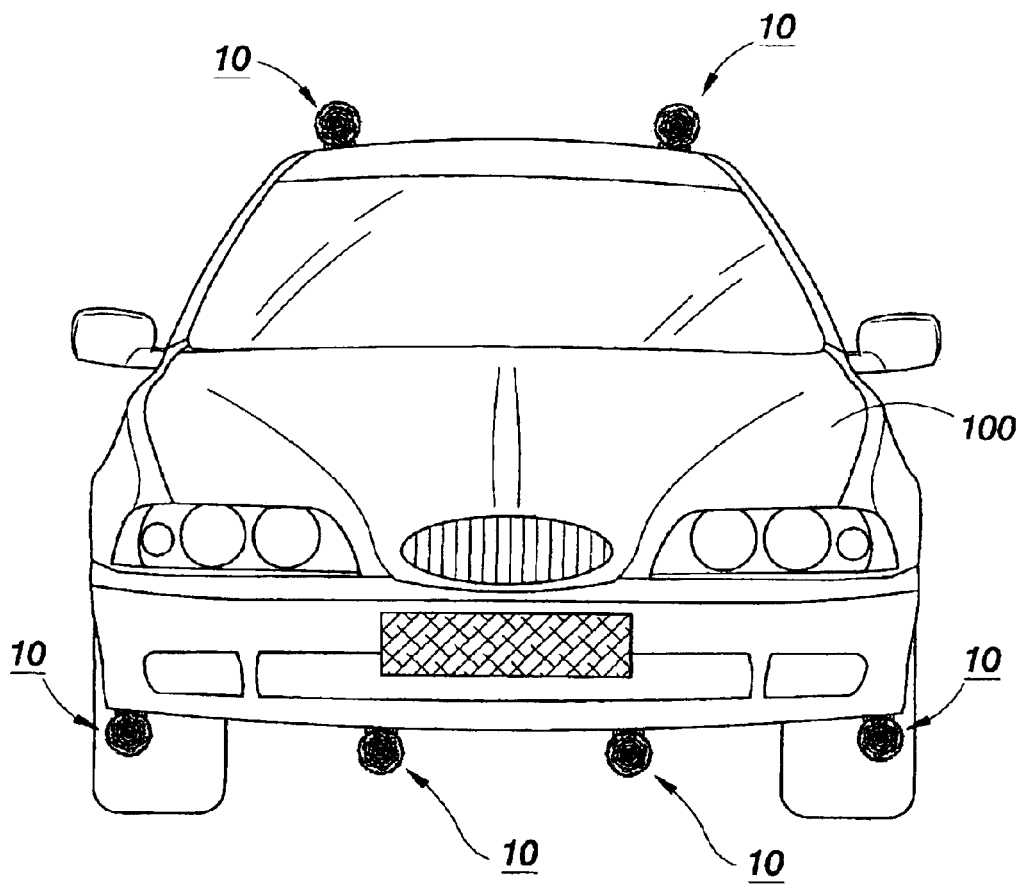
FIG. 7 shows one embodiment of the present invention, where the auxiliary lamp has not been used to a vehicle body.
Figure 8:
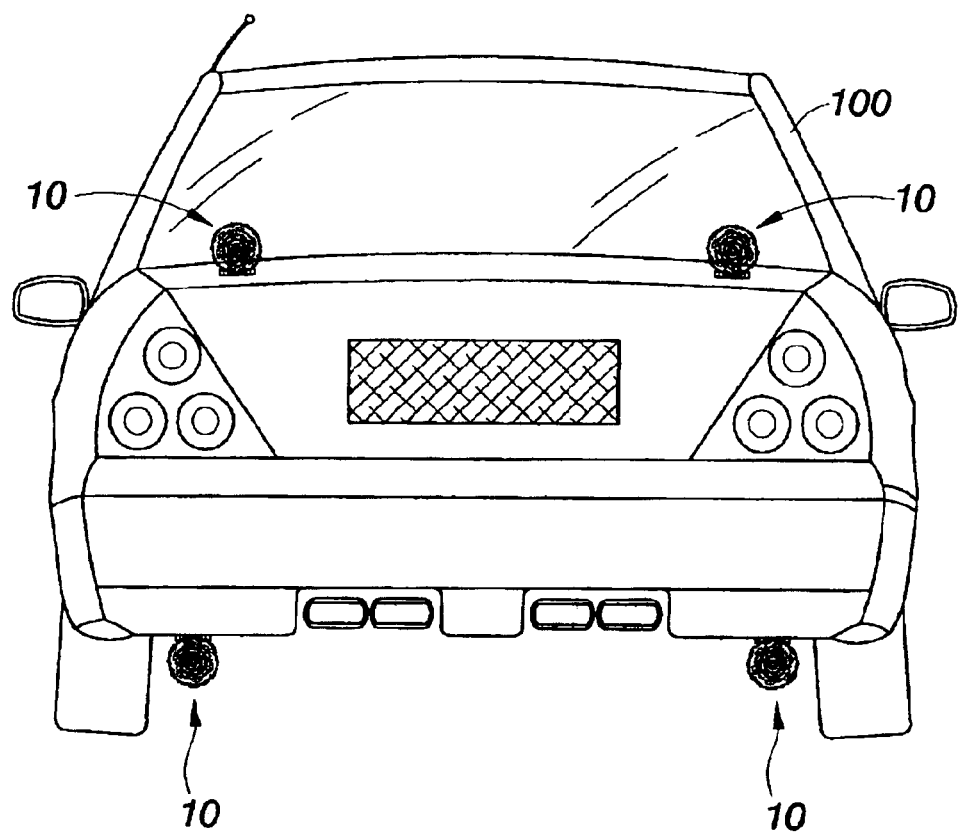
FIG. 8 shows one embodiment of the present invention where the auxiliary lamp of the present invention is used to a vehicle body.

With reference to FIGS. 7 and 8, one embodiment showing that the auxiliary lamp of the present invention is used to a vehicle body, for example, a motorcycle, a bicycle, or a car, or is used to a safety hat. In the following the vehicle body 100 is used as an example. The auxiliary lamp 10 can be installed on any position of the vehicle body 100 as desired. A bottom plate of the auxiliary lamp 10 has a strong magnet 15 for being fixed to a metal surface of the vehicle body 100, such as top of the vehicle body, or front or rear flow interference plate, sides of the vehicle body 100, a cover of an engine, a cover of baggage. The front or rear surface of the auxiliary lamp 10 can face forwards so as to have an attractive appearance and be safe as the vehicle body 100 is driven at night. Thereby, the auxiliary lamp 10 of the present invention has the function of wet and water-proof, and can be detached or attached easily.

Figure 9:
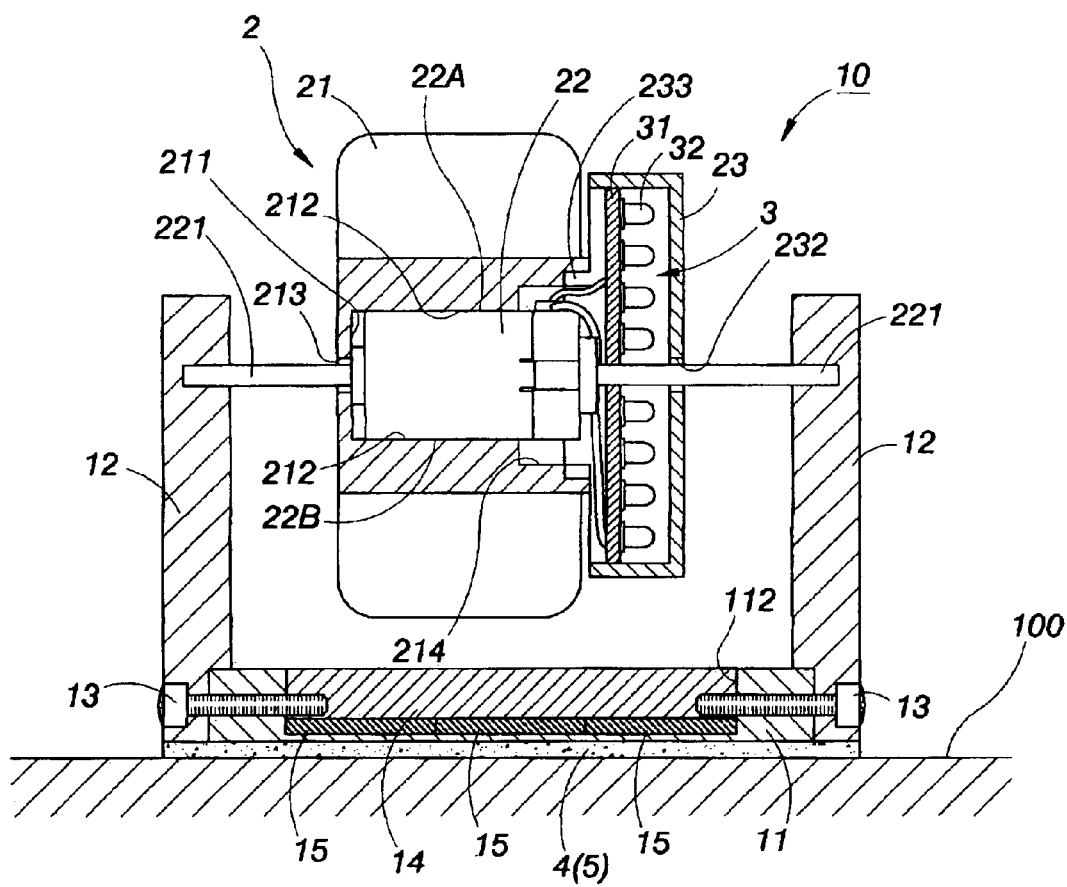
FIG. 9 is a schematic view showing another structure of the auxiliary lamp of the present invention.

Referring to FIG. 9, since a surface of the vehicle body 100 is a painted smooth and light surface and usually coated with wax. To have beautiful outlook, a bottom of the auxiliary lamp 10 can be added with a protection layer 4 with shock absorption effect. The protection layer 4 is a soft and skidproof layer for avoiding to scrapping painted surface. The skidproof property serves to prevent the movement of the auxiliary lamp 10. Moreover, if necessary, when the auxiliary lamp 10 is installed to a portion can not be absorbed magnetically, the protection layer 4 is replaced by an adhering layer 5 (such as a double face tape) so that the auxiliary lamp 10 can be adhered to a portion of a vehicle body, like protecting rods, flow interference masks, safety hats, plastic casings, etc.

Advantages of the present invention will be described here. In the present invention, wind power can be used to light up the auxiliary lamp without using battery. Thereby, no battery is necessary to be updated.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wind power driving auxiliary lamp comprising:
   a seat having a bottom plate and two supporting frames firmly secured to two sides of the bottom plate;
   a generator having a blade set and a small power generator firmly secured to a blade groove of the blade set; the small power generator having a central pivotal shaft; two ends of a central pivotal shaft passing through the two supporting frames so that the blade set and the small power generator are positioned between the two supporting frames; by the motionless central pivotal shaft, the blade set and the small power generator rotate synchronously;
   a transparent cover; the central pivotal shaft passing through the transparent cover so that the transparent cover is fixed to the blade groove;
   a circuit device including a circuit board in the transparent cover and a light emitting body set on the circuit board; two power lines connecting the circuit device to the small power generator;
   wherein in moving, air will push the blade set so that the small power generator and the blade set rotate synchronously, the small power generator will rotate with the central pivotal shaft so as to generate direct current power to be supplied to the light emitting body set.

2. The auxiliary lamp as claimed in claim 1, wherein the light emitting body set is distributed as two banks of light emitter bodies, in rotation, the two banks of light emitting bodies emit light as a plurality of concentric circle due to visual effect.

3. The auxiliary lamp as claimed in claim 1, wherein an integrated circuit is installed on the circuit structure for controlling light sequence of the light emitting body set so as to generate single or multiple or mixing color flashes.

4. The auxiliary lamp as claimed in claim 1, wherein a bottom plate of the auxiliary lamp has a strong magnet for being fixed to a metal surface.

5. The auxiliary lamp as claimed in claim 1, wherein the seat is dispose with a protection layer with shock absorption effect; the protection layer is a soft and skidproof layer for avoiding the scrapping the painted surface.

6. The auxiliary lamp as claimed in claim 1, wherein an adhering layer is disposed at a lower side of the seat for being adhered to a nonmetal surface.

* * * * *